United States Patent [19]

Noel

[11] Patent Number: 5,115,890

[45] Date of Patent: May 26, 1992

[54] PRESSURE FLUID MECHANISM SUCH AS A MOTOR OR A PUMP COUPLED TO A BRAKING DEVICE

[75] Inventor: Alain W. Noel, Verberie, France

[73] Assignee: Poclain Hydraulics, Verberie, France

[21] Appl. No.: 614,933

[22] Filed: Nov. 16, 1990

[30] Foreign Application Priority Data

Nov. 30, 1989 [FR] France .................. 89 15840

[51] Int. Cl.$^5$ .................. F16D 65/24; F16D 55/00; F16D 63/00; F01B 11/00
[52] U.S. Cl. .................. 188/71.5; 188/170; 188/71.1; 188/70 R; 188/67; 91/491
[58] Field of Search .................. 188/71.5, 170, 369, 188/72.1, 71.1, 70 R, 68, 69, 67, 73.1, 381; 91/491

[56] References Cited

U.S. PATENT DOCUMENTS

| | | | |
|---|---|---|---|
| 4,157,056 | 6/1979 | Allart et al. | 91/491 |
| 4,605,103 | 8/1986 | Carré et al. | 188/71.5 |
| 4,607,730 | 8/1986 | Paisley | 188/71.5 |
| 4,790,413 | 12/1988 | Meynier | 188/71.5 |
| 5,009,290 | 4/1991 | Harada et al. | 188/71.5 |

FOREIGN PATENT DOCUMENTS 1399596  7/1975  United Kingdom.
217677A  9/1986  United Kingdom.

*Primary Examiner*—Joseph F. Peters, Jr.
*Assistant Examiner*—Kenneth Lee
*Attorney, Agent, or Firm*—Sheridan Ross & McIntosh

[57] ABSTRACT

The invention relates to a pressure fluid mechanism comprising: a reaction cam; a cylinder block mounted to rotate relative to the cam and including a central void and an axial extension enabling it to be fixed to a support; and an internal fluid distributor valve constrained to rotate with the cam by a link mechanism which extends inside the central void, the cylinder block and its extension constituting an assembly which is interposed between the cam and the internal fluid distributor valve. According to the invention: a) a braking device is disposed at the end of the mechanism towards which the link device extends, the braking device being disposed between the cylinder block and the cam and including a chamber containing brake disks, which chamber is delimited by a cover; b) the link mechanism is constrained to rotate together with the cover of the chamber containing the disks; and c) the cover of the chamber is constrained to rotate with the cam. An application of the mechanism is providing a compact hydraulic motor provided with a brake.

9 Claims, 4 Drawing Sheets

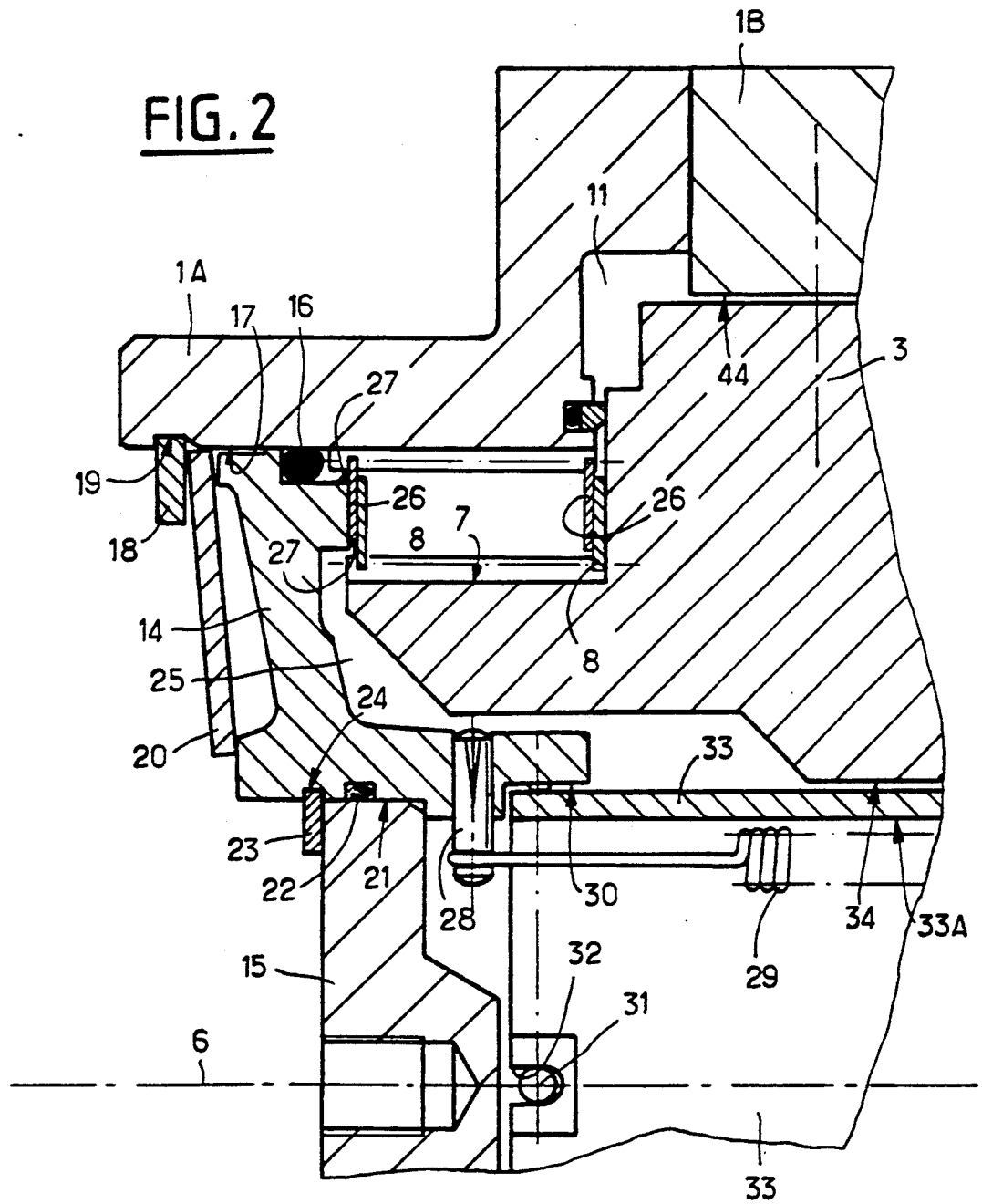

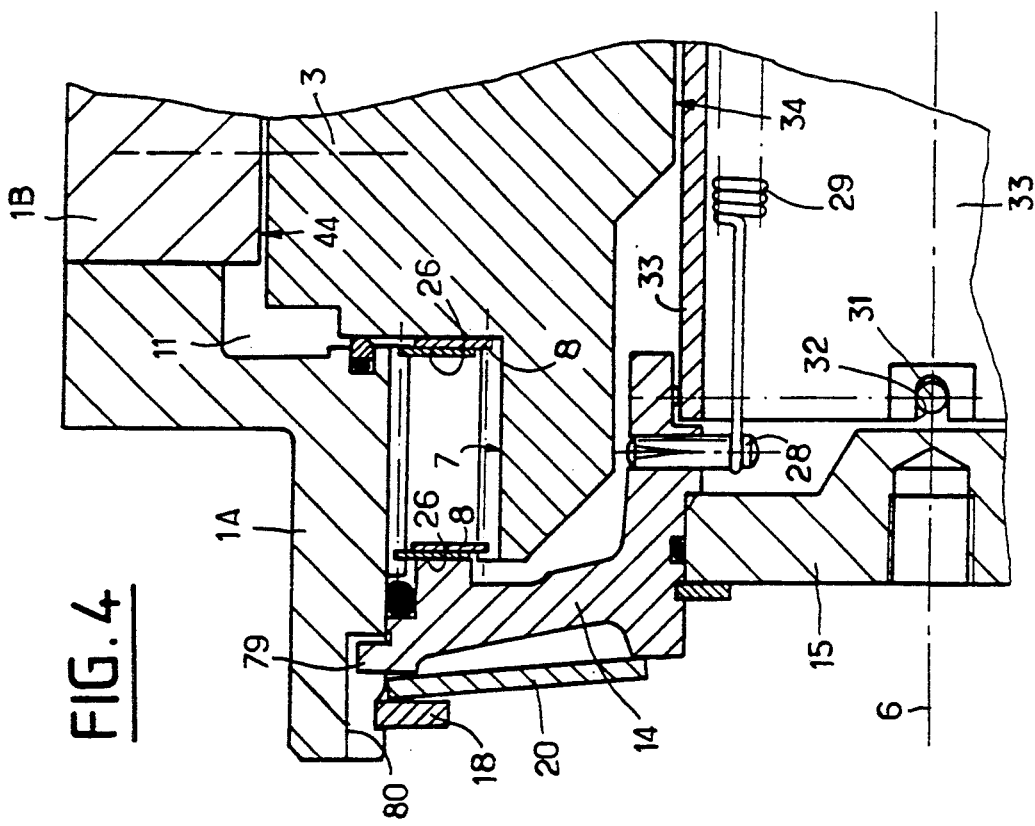
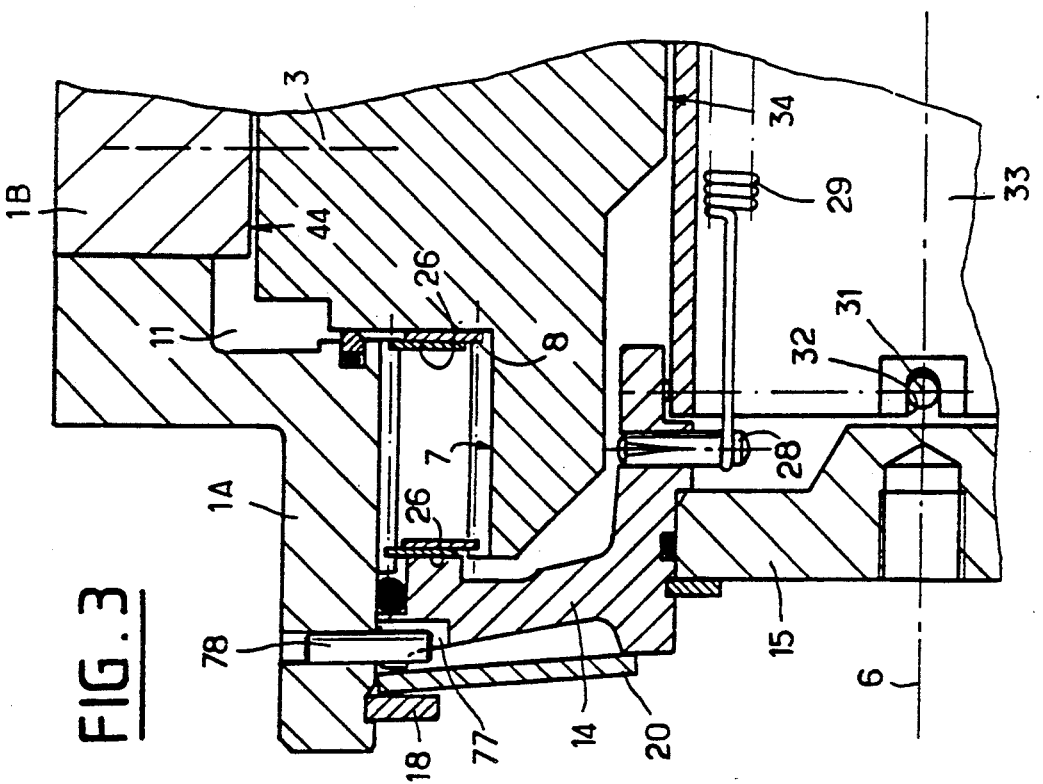

PRESSURE FLUID MECHANISM SUCH AS A MOTOR OR A PUMP COUPLED TO A BRAKING DEVICE

FIELD OF THE INVENTION

The field of the invention is that of pressure fluid mechanisms, motors or pumps, such as described in particular in French patent specification number FR-A-2 364 041 and comprising: a reaction cam; a cylinder block mounted to rotate relative to the cam and comprising firstly a central void and secondly a plurality of cylinders each containing a piston suitable for bearing against said cam and delimiting a working chamber inside said cylinder, which cylinder block further includes an axial extension enabling it to be fixed to a support such as a vehicle chassis; an internal fluid distributor valve constrained to rotate with the cam in said relative rotation by means of a link device which extends inside said central void of the cylinder block in the opposite axial direction to the direction in which said extension of the cylinder block extends, said link device extending beyond the corresponding end of said cylinder block and itself being constrained with respect to said relative rotation to rotate firstly with said cam and secondly with said internal fluid distributor valve; the cylinder block and its extension constituting an assembly interposed between the cam and the internal fluid distributor valve.

BACKGROUND OF THE INVENTION

As in all pressure fluid mechanisms of this type, the cylinder block is mounted to rotate relative to the cam and the internal fluid distributor valve must be constrained with respect to said cam with respect to said relative rotation to rotate with said cam.

When the pressure fluid mechanism is coupled to a brake including a stack of disks contained in a special chamber, the invention takes advantage of the special structure of the braking device for simplifying the connection between the internal fluid distributor valve and the cam.

SUMMARY OF THE INVENTION

To this end, in a mechanism of the invention: a) a braking device is disposed at the end of the mechanism towards which the link device extends, the braking device being disposed between the cylinder block and the cam, and including a chamber containing the disks of a stack of brake disks and delimited by a cover extending transversely relative to the axis of relative rotation; b) the link device includes a link mechanism which is constrained with respect to the relative rotation to rotate together with the cover of said chamber containing the disks; and c) the cover of said chamber containing the brake disks is constrained with respect to said relative rotation to rotate with said cam.

In addition, the following advantageous dispositions are preferably adopted:

the link mechanism comprises an add-on part distinct from the internal distributor valve and from said cover of the chamber containing the brake disks, which add-on part is constrained by means of a set of complementary studs and notches to rotate together with at least one of said two items, namely the cover and the internal distributor valve with respect to said relative rotation;

said stack of brake disks includes an end disk which is constrained with respect to said relative rotation to rotate with said cam, said cover of the chamber containing the brake disk being welded to said end disk;

the cover of the chamber containing the brake disk is constrained with respect to said relative rotation to rotate with the cam by means of a set of complementary studs and notches;

the braking device includes an unbraking chamber delimited by a piston which is constituted by said cover of the chamber containing the brake disk;

the link mechanism is constituted by a sort of sleeve including an axial void;

a resilient member is disposed inside said axial void, connecting the internal distributor valve to the cover of the chamber containing the brake disks, and tending to urge these two items, namely the internal distributor valve and the cover of said chamber axially towards each other;

the internal distributor valve and the cover of the chamber containing the brake disks are provided with respective studs to which the ends of said resilient member are fastened; and/or the cover of the chamber containing the brake disks is made up of two concentric portions.

It should be observed that in the most recent multi-disk braking devices, the chamber containing the brake disks also constitutes an unbraking chamber suitable for receiving the pressure fluid to eliminate the braking action and consequently to push back the thrust member which normally presses the various disks against one another.

In a particular case, the cover of the chamber containing the disks constitutes the piston of the unbraking chamber, and the invention as defined above enables said piston of the unbraking chamber to move axially while maintaining the connection between the internal fluid distributor valve and said piston constituted by the cover of the chamber containing the disks, with this being achieved via the link mechanism and also via the resilient member as provided.

When a braking device is coupled to a pressure fluid mechanism, the advantages of the invention lie in providing the link between the internal fluid distributor valve and the cam very simply, taking advantage of components that are already present, in particular the end disk of the stack of brake disks and the cover of the chamber containing the brake disks.

This provides a disposition which is more compact and as light as possible, and which is also less expensive because it makes use of parts that are already present.

BRIEF DESCRIPTION OF THE DRAWINGS

Embodiments of the invention are described by way of example with reference to the accompanying drawings, in which:

FIGS. 2, 3, and 4 are axial sections through details of the structure of said motor, respectively corresponding to said first embodiment and to second and third embodiments.

DETAILED DESCRIPTION

Figure 1:
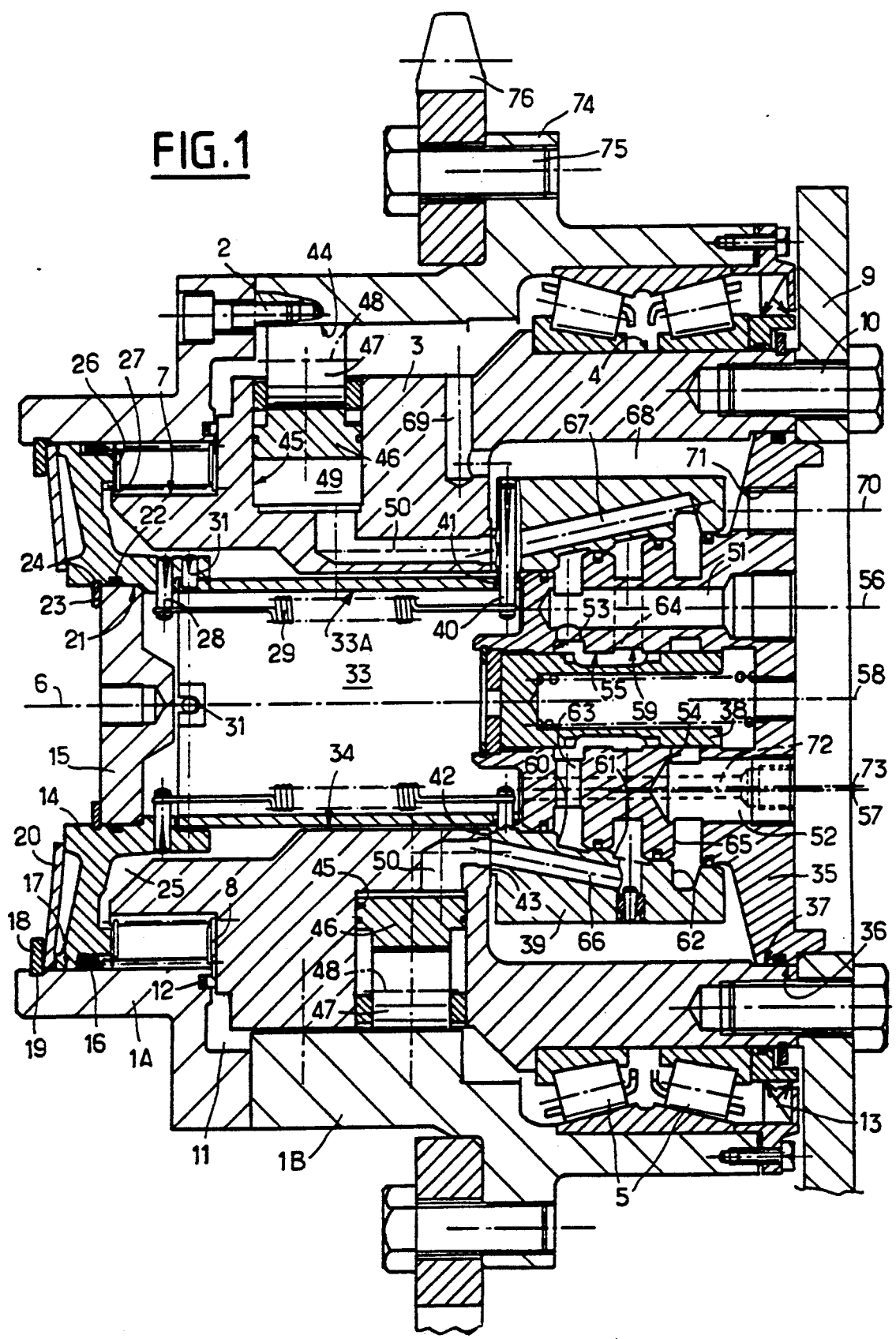
FIG. 1 is an axial section through a hydraulic motor constituting a first embodiment of the invention.

The assembly shown in FIG. 1 comprises a hydraulic motor coupled to a braking device having multiple disks, and it is more particularly constituted by:

a two-part casing assembly comprising parts 1A and 1B assembled together by screws 2;

a cylinder block 3 having, on a first side, a first extension 4 enabling it to be mounted to rotate about a geometrical axis 6 of the cylinder block 3 relative to the casing 1A-1B via roller bearings 5 interposed between casing part 1B and the extension 4 of the cylinder block, and on a second side, a second extension 7 enabling the disks 8 of a braking device to be mounted to rotate with said second extension 7;

a first cover 9 which is fixed to the end of the first extension 4 by screws 10 and which closes the enclosure 11 that exists between the outer periphery of the cylinder block 3 and the inside face of the casing 1A-1B, with interposed sealing rings 12 and 13, sealing ring 12 being between the cylinder block 3 and casing part 1A, and sealing ring 13 being between the cylinder block 3 and casing part 1B, thereby insulating the enclosure 11 from the external environment of the motor;

a second cover 14-15 comprising firstly a ring 14 mounted with an interposed sealing ring 16 to slide relative to a bore 17 provided in casing part 1A, there being a segment 18 inserted in a groove 19 in the bore 17 to constitute a displacement-limiting abutment preventing the ring 14 from sliding out from the bore 17, and a resilient washer 20 which is disposed between the segment 18 and the ring 14 to urge the ring 14 towards the inside of the casing, the second cover further comprising a central part 15 mounted in a central bore 21 of the ring 14 with an interposed sealing ring 22, a segment 23 being inserted in a groove 24 in the bore 21 to constitute a displacement-limiting abutment preventing the central part 15 from sliding out from the bore 21, the second cover 14-15 co-operating with casing portion 1A to delimit a chamber 25 containing the brake disks of the braking device;

brake disks 8 constrained to rotate with the second extension 7 of the cylinder block 3;

brake disks 26 constrained to rotate with casing part 1A and each disposed between two of the brake disks 8, apart from the brake disk 26 which is disposed at the end of the stack of disks, which brake disk 26 is welded at 27 to the ring 14 that forms a part of the second cover 14-15;

a set of studs 28 for retaining springs 29, these studs 28 being fixed to an internal extension 30 of the ring 14;

a set of studs 31 also fixed to the extension 30 of the ring 14 and penetrating into notches 32 of a sleeve-forming part 33 which is contained in a central void 34 inside the cylinder block 3 and the second extension 7 thereof, with co-operation between the studs 31 and the notches 32 constraining the part 33 to rotate together with the second cover 14-15;

a hub 35 also contained in the central void 34 of the cylinder block 3 and disposed adjacent to the first cover 9 with the periphery 36 of the hub 35 being received in a bore 37 of the first extension 4 of the cylinder block 3, the hub being fixed to the cylinder block 3 and being held in place inside the bore 37 by means of the first cover 9;

a slide 38 for selecting the cylinder capacity of the motor, said slide being slidably mounted inside the hub 35;

an internal fluid distributor valve 39 provided with studs 40 co-operating with notches 41 in the part 33, thereby constraining said internal distributor valve 39 to rotate with the second cover 14-15, the springs 29 being fixed at their ends to the studs 28 and to the studs 40, thereby serving to keep the internal fluid distributor valve assembled with the cylinder block 3, including during motor assembly, the internal fluid distributor valve 39 including a plane face 42 extending perpendicular to the axis of rotation 6 and bearing against a plane face 43 of the cylinder block 3, and likewise extending perpendicular to the axis of rotation 6;

a humped cam 44 machined in the inside periphery of casing part 1B;

two parallel transverse sets of cylinders 45 formed in the cylinder block 3, the cylinders extending relative to the axis of rotation 6 and being regularly spaced apart in each of the sets;

pistons 46 slidably mounted in respective cylinders and delimiting a working chamber 49 in each cylinder;

each piston 46 having a roller 47 mounted at the end thereof to rotate about a pin 48 parallel to the axis of rotation 6 and to engage the cam 44; and cylinder ducts 50 connecting each working chamber 49 to the plane face 43 of the cylinder block 3.

In conventional manner and as known before the invention, therefore not requiring a detailed description herein, the hub 35 includes two internal ducts 51 and 52 connecting external ducts 56 and 57 to respective grooves 53 and 54 contained in the hub and communicating with the bore 55 in which the slide 38 slides. The bore 55 is itself connected to an external duct 58. The hub 35 includes a third groove 59 which communicates with the bore 55. The internal fluid distributor valve 39 itself includes three grooves 60, 61, and 62 which communicate via respective ducts 63, 64, and 65 with respective ones of the grooves 53, 59, and 54 of the hub, internal ducts 66 and 67 connecting the plane face 42 to respective ones of the grooves 61 and 62 and communicating with the cylinder ducts 50 in succession. This known assembly serves to feed fluid under pressure in known manner to the various working chambers 49 in succession and it enables at least two different operating cylinder capacities to be obtained depending on the position of the cylinder capacity selector slide 38. The circuit for controlling operation thereof is described below with reference to FIG. 5.

The following dispositions should be observed:

a chamber 68 is delimited between the inside of the first extension 4 of the cylinder block 3, the internal distributor valve 39, and the hub 35;

the chamber 11 is in permanent communication with the chamber 68 via a duct 69 passing through the cylinder block 3;

the chamber 68 is permanently connected to an external duct 70 via duct 71 passing through the hub 35;

a duct 72 passing through the hub 35 interconnects the chamber 25 in which the part 33 is situated and the external duct 73;

an external fixing flange 74 is fixed to casing part 1B and enables a toothed wheel 76 to be fixed thereto by means of screws 75;

the cover 9 constitutes a portion of a frame or chassis, e.g. part of a vehicle, and it extends beyond the motor per se (downwards in FIG. 1);

the cylinder block 3 and its extension 4 constitute an assembly which is interposed between the internal distributor valve 39 and the cam 44, preventing any direct link between these two items;

the chamber 25 containing the brake disks also constitutes an unbraking chamber that may contain pressure fluid having the effect of pushing back the piston-forming cover 14–15 against the resilient force of the washer 20; and the sleeve-shaped part 33 includes an axial void 33A inside which the springs 29 are disposed.

In a second embodiment shown in FIG. 3, the end brake disk 26 of the stack of brake disks is not welded to the ring 14. Instead the ring includes one or more notches 77 which co-operate with studs 78 received therein and fixed to casing part 1A.

In a third embodiment shown in FIG. 4, the end brake disk 26 of the stack of brake disks is not welded to the ring 14. One or more studs 79 projecting from the ring 14 are engaged in notches 80 formed in casing part 1A.

Whichever embodiment is selected, it may be observed that the internal distributor valve 39 is constrained to rotate about the axis 6 together with the cam 44 by the following linkage: studs 40, notches 41, link part 33, notches 32, studs 31, ring 14 which is constrained to rotate together with casing part 1A, screws 2, and casing part 1B. The ring 14 is constrained to rotate together with casing part 1A in three different ways depending on the embodiment:

either (FIGS. 1 and 2) by welding (27) the ring 14 to the end brake disk 26, said brake disk 26 being constrained to rotate together with casing part 1A, by assembly and by function;

or (FIG. 3) by co-operation between notches 77 and studs 78;

or else (FIG. 4) by co-operation between notches 80 and studs 79.

Figure 5:
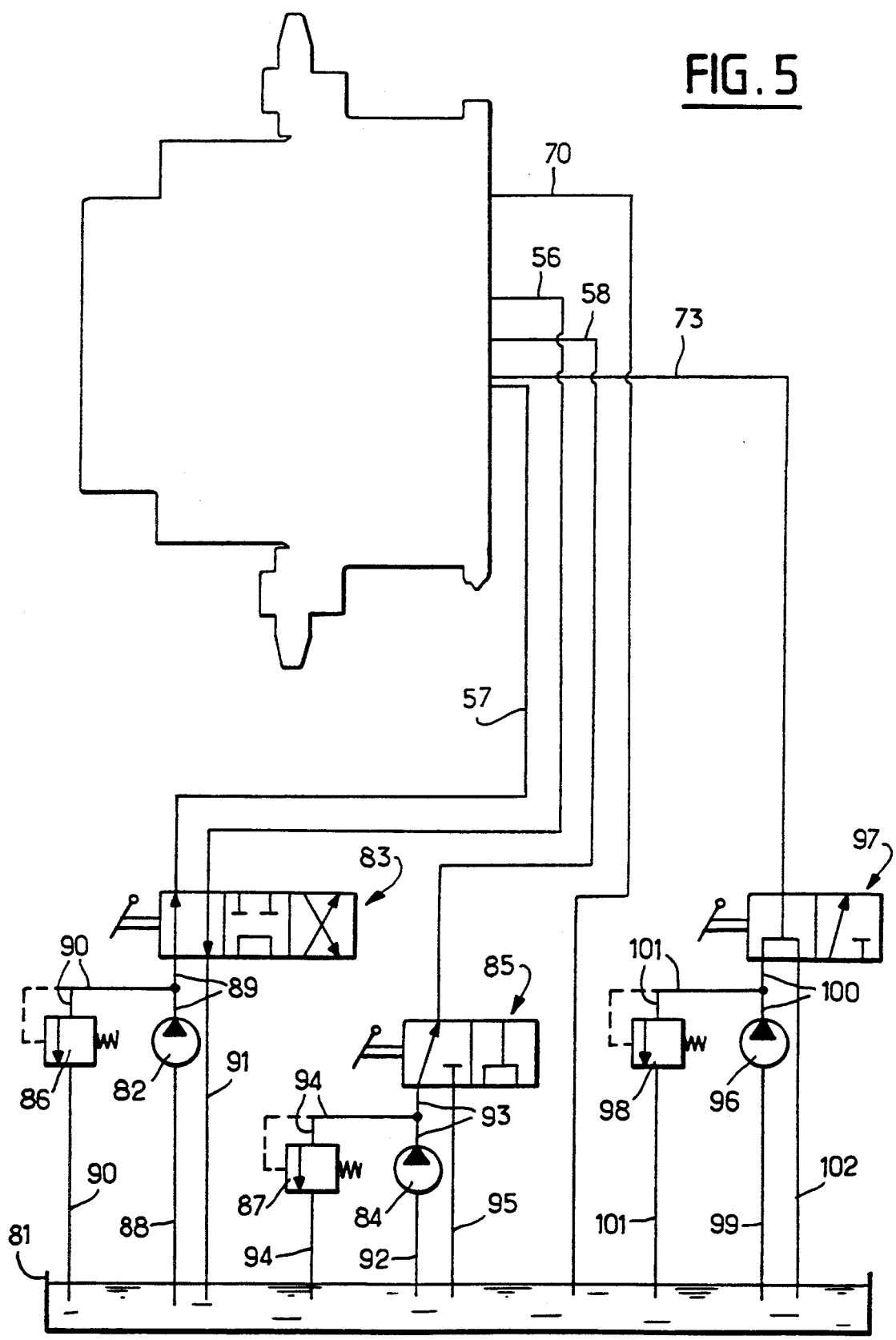
FIG. 5 is a diagram of the hydraulic circuit powering the motor of FIG. 1.

The control circuit shown in FIG. 5 comprises:
a reservoir 81 of fluid that is not under pressure;
a main pump 82;
a three-position fluid distributor valve 83;
an auxiliary pump 84 for controlling cylinder capacity selection;
a two-position fluid distributor valve 85;
an unbraking control pump 96;
a two-position fluid distributor valve 97; and
three rated safety valves 86, 87, and 98 for providing protection against excess pressure.

These components are interconnected by the following ducts:

an inlet duct 88 for the main pump 82 and connecting it to the reservoir 81;

a pressure fluid delivery duct 89 connecting the main pump 82 to fluid distributor valve 83;

a duct 90 connecting the delivery duct 89 to the reservoir 81, with safety valve 86 being disposed on this duct 90;

a duct 91 connecting the fluid distributor valve 83 to the reservoir 81;

ducts 56 and 57 external to the motor and connected to the fluid distributor valve 83;

the inlet duct 92 of the auxiliary pump 84 connecting said pump to the reservoir 81;

the pressure fluid delivery duct 93 connecting the auxiliary pump 84 to fluid distributor valve 85;

a duct 94 connecting the delivery duct 93 to the reservoir 81, with safety valve 87 being disposed on this duct 94;

a duct 95 connecting the fluid distributor valve 85 to the reservoir 81;

external duct 58 of the motor is connected to fluid distributor valve 85;

inlet duct 99 of the pump 96 connects the pump to the reservoir 81;

pressure fluid delivery duct 100 connects the pump 96 to fluid distributor valve 97;

a duct 101 connects delivery duct 100 to the reservoir 81, with safety valve 98 being disposed on said duct 101;

a duct 102 connects fluid distributor valves 97 to reservoir 81;

external duct 73 of the motor is connected to distributor valve 97; and external motor duct 70 is connected to the reservoir 81.

The three positions of the fluid distributor valve 83 correspond to:

a first position interconnecting ducts 89 and 57 and ducts 56 and 91;

a second position interconnecting ducts 89 and 91 and closing-off ducts 56 and 57; and a third position interconnecting ducts 96 and 56 and ducts 91 and 57.

The two positions of distributor valve 85 correspond to:

a first position interconnecting ducts 93 and 58 and closing-off duct 95; and a second position interconnecting all three ducts 93, 95 and 58.

The two positions of distributor valve 97 correspond to:

a first position interconnecting all three ducts 100, 102 and 73; and a second position interconnecting ducts 100 and 3 and closing-off duct 102.

In conventional and known manner, this makes it possible:

to feed the motor with pressure fluid and to cause it to rotate in one direction or the other (valve 83);

to select the operating cylinder capacity of said motor valve 85 and cylinder capacity selector slide 38); and to control unbraking of the braking device (valve 97 in its second position), or to apply braking (valve 97 in its first position), with the resilient washer 20 then acting alone to press the disks 26 against the disks 8.

The novelty of the above-described assembly lies in constraining the internal distributor valve 39 to rotate with the cam 44 and in doing this firstly by means of the braking device and its brake disks 26 or its cover 40–50, and secondly by means of a complementary link part 33 connecting said cover to said internal distributor valve 39.

The solution adopted makes it possible to avoid using an additional link (not taking account of the existence of the braking device), thereby saving weight and making for a more compact assembly.

The invention is not limited to the embodiments described, and on the contrary covers any variant that could be applied thereto without going beyond the scope of the claims.

I claim:

1. A pressure fluid mechanism, a motor or a pump, comprising:
a reaction cam;
a cylinder block mounted to rotate relative to the cam and comprising firstly a central void and secondly a plurality of cylinders each containing a piston suitable for bearing against said cam and delimiting a working chamber inside said cylinder, which cylinder block further includes an axial extension enabling it to be fixed to a support such as a vehicle chassis;

an internal fluid distributor valve constrained to rotate with the cam in said relative rotation by means of a link device which extends inside said central void of the cylinder block in the opposite axial direction to the direction in which said extension of the cylinder block extends, said link device extending beyond the corresponding end of said cylinder block and itself being constrained with respect to said relative rotation to rotate firstly with said cam and secondly with said internal fluid distributor valve;

the cylinder block and its extension constituting an assembly interposed between the cam and the internal fluid distributor valve;

wherein:
- a) a braking device is disposed at the end of the mechanism towards which the link device extends, the braking device being disposed between the cylinder block and the cam, and including a chamber containing the disks of a stack of brake disks and delimited by a cover extending transversely relative to the axis of relative rotation;
- b) the link device includes a link mechanism which is constrained with respect to the relative rotation to rotate together with the cover of said chamber containing the disks; and
- c) the cover of said chamber containing the brake disks is constrained with respect to said relative rotation to rotate with said cam.

2. A mechanism according to claim 1, wherein the link mechanism comprises an add-on part distinct from the internal distributor valve and from said cover of the chamber containing the brake disks, which add-on part is constrained by means of a set of complementary studs and notches to rotate together with at least one of said two items, namely the cover and the internal distributor valve with respect to said relative rotation.

3. A mechanism according to claim 1, wherein said stack of brake disks includes an end disk which is constrained with respect to said relative rotation to rotate with said cam, said cover of the chamber containing the brake disk being welded to said end disk.

4. A mechanism according to claim 1, wherein the cover of the chamber containing the brake disk is constrained with respect to said relative rotation to rotate with the cam by means of a set of complementary studs and notches.

5. A mechanism according to claim 1, wherein the braking device includes an unbraking chamber delimited by a piston which is constituted by said cover of the chamber containing the brake disk.

6. A mechanism according to claim 1, wherein the link mechanism is constituted by a sort of sleeve including an axial void.

7. A mechanism according to claim 6, wherein a resilient member is disposed inside said axial void, connecting the internal distributor valve to the cover of the chamber containing the brake disks, and tending to urge these two items, namely the internal distributor valve and the cover of said chamber axially towards each other.

8. A mechanism according to claim 7, wherein the internal distributor valve and the cover of the chamber containing the brake disks are provided with respective studs to which the ends of said resilient member are fastened.

9. A mechanism according to claim 1, wherein the cover of the chamber containing the brake disks is made up of two concentric portions.

* * * * *